(12) United States Patent
Fuchs et al.

(10) Patent No.: US 11,105,379 B2
(45) Date of Patent: Aug. 31, 2021

(54) JOINT ARRANGEMENT

(71) Applicant: Neumayer Tekfor Engineering GmbH, Hausach (DE)

(72) Inventors: Christian Fuchs, Fischerbach (DE); Martin Lehmann, Hornberg (DE); Daniel Schoener, Oberharmersbach (DE)

(73) Assignee: Neumayer Tekfor Engineering GmbH, Hausach (DE)

( * ) Notice: Subject to any disclaimer, the term of this patent is extended or adjusted under 35 U.S.C. 154(b) by 349 days.

(21) Appl. No.: 16/183,403

(22) Filed: Nov. 7, 2018

(65) Prior Publication Data

US 2019/0145466 A1 May 16, 2019

(30) Foreign Application Priority Data

Nov. 10, 2017 (DE) ..................... 10 2017 010 421.2

(51) Int. Cl.
*F16D 3/223* (2011.01)
*F16D 1/06* (2006.01)
*F16D 1/10* (2006.01)
*F16D 3/84* (2006.01)

(52) U.S. Cl.
CPC ............... *F16D 3/223* (2013.01); *F16D 1/06* (2013.01); *F16D 1/10* (2013.01); *F16D 3/845* (2013.01); *F16D 2001/103* (2013.01); *F16D 2003/22303* (2013.01); *F16D 2003/22313* (2013.01); *F16D 2003/22326* (2013.01); *Y10S 464/906* (2013.01)

(58) Field of Classification Search
CPC ... F16D 3/223; F16D 1/06; F16D 1/10; F16D 3/845; F16D 2001/103; F16D 2003/22303; F16D 2003/22313; F16D 2003/22326; Y10S 464/906
USPC .................................................. 464/145, 182
See application file for complete search history.

(56) References Cited

U.S. PATENT DOCUMENTS

| 3,714,797 A | 2/1973 | Fisher | |
| 3,858,412 A * | 1/1975 | Fisher | F16D 3/227 |
| | | | 464/906 |
| 4,185,475 A | 1/1980 | Kleinschmidt et al. | |
| 4,262,498 A * | 4/1981 | Krude | F16D 3/224 |
| | | | 464/145 |

(Continued)

FOREIGN PATENT DOCUMENTS

| DE | 10 2006 062 822 B4 | 4/2015 | |
| EP | 2 264 327 B1 | 1/2012 | |
| GB | 637718 * | 5/1950 | .................... 464/145 |

OTHER PUBLICATIONS

German-language Search Report issued in counterpart German Application No. 10 2017 010 421.2 dated Aug. 24, 2018 (nine (9) pages).

*Primary Examiner* — Greg Binda
(74) *Attorney, Agent, or Firm* — Crowell & Moring LLP (57) ABSTRACT

A joint arrangement includes comprising a joint, a nut and an adapter unit. The joint has an inner hub, an outer hub, balls and a cage with recesses for the balls. The inner hub has a recess with an inner toothing for receiving a first shaft. A cavity of the joint arrangement located around the balls is closed on two end sides by a respective sealing device. The adapter unit includes a first adapter portion and a second adapter portion which cooperate to transmit torque across the joint arrangement to or from a second shaft.

3 Claims, 5 Drawing Sheets

(56) References Cited

U.S. PATENT DOCUMENTS

2007/0032303 A1 2/2007 Disser et al.
2008/0167134 A1 7/2008 Disser

* cited by examiner

JOINT ARRANGEMENT

CROSS REFERENCE TO RELATED APPLICATION

This application claims priority under 35 U.S.C. § 119 from German Patent Application No. 10 2017 010 421.2, filed Nov. 10, 2017, the entire disclosures of which are herein expressly incorporated by reference.

BACKGROUND AND SUMMARY OF THE INVENTION

The present invention relates to a joint arrangement.

The joint arrangement consists at least of a joint and of further components which permit the joint to be fixed between two shafts. The joint can therefore be connected to two shafts. The joint and the shafts here are, for example, parts of a drive train of a motor vehicle. A torque is primarily transmitted via the shafts. The joint permits, for example, the compensation for angles between the shafts in the vehicle.

During the installation, the joint has to be connected to the two shafts, and, in addition, joint grease for the joint also has to be introduced. The joint grease is intended to be correspondingly surrounded by a cavity, which is sealed as far as possible, of the joint arrangement. Joint grease here is a general term for a substance which serves for lubricating the joint.

Joints arranged between a cover and a sealing bellows are disclosed in DE 10 2006 062 822 B4 (corresponding to US 2008/167134) or in EP 2 264 327 B1 (corresponding to US 2007/32303).

A closed arrangement with two mutually opposite joints is disclosed in U.S. Pat. Nos. 3,714,797 and 4,185,475. Two sealing bellows are in each case used here.

The object on which the invention is based therefore consists in proposing a joint arrangement which is suitable for the installation taking the introduction of the joint grease into consideration.

The invention achieves the object by means of a joint arrangement comprising a joint, a nut and an adapter unit. The nut serves here for fixing to a first shaft, and the adapter unit permits the connection to a second shaft. The joint has an inner hub, an outer hub, balls and a cage with recesses for the balls. What is referred to as a constant velocity joint is therefore involved. The inner hub has a recess with an inner toothing for receiving a first shaft. The first shaft is therefore preferably intended to have an outer toothing matching the inner toothing. The nut permits the fixing of the inner hub, in which the the first shaft is introduced, by the inner hub, for example, being braced against a bearing on the first shaft or, for example, against a step of the first shaft. A cavity of the joint arrangement is located around the balls. This cavity permits, for example, the introduction of the joint grease. The cavity here is closed on two end sides by a respective sealing device. The end sides are preferably opposite each other here along a longitudinal axis of the joint arrangement. The end sides furthermore preferably face the first shaft or a second shaft.

One way of installing the joint arrangement can therefore consist, for example, in the following steps:

The joint arrangement is connected to a first shaft by the shaft being introduced into the inner hub.

The fixing relative to the first shaft takes place by tightening the nut.

The joint grease is then introduced into the cavity. Alternatively, it has been introduced into the cavity previously.

The second sealing device is closed.

The connection to the second shaft subsequently takes place via the adapter unit. Depending on the configuration of the adapter unit, this can also take place in at least two steps.

Depending on the configuration, the first sealing device is closed before the connection to the first shaft, or this takes place subsequently.

In one refinement, it is provided that one of the sealing devices, specifically in particular the sealing device assigned to the first shaft—and therefore referred to below as the first sealing device—is formed by a sealing bellows. The sealing bellows is connected to an outer side of the inner hub and to a housing surrounding the outer hub of the joint. The sealing bellows of the first sealing device extends in a general form from the inner hub to the outer hub of the joint.

In one refinement, the housing which also surrounds the outer hub is connected to an outer side of the adapter unit.

In one refinement, the adapter unit is of at least two-part design. The adapter unit therefore has a first adapter component and a second adapter component. The two-part design permits, for example, a transition between different radii. For example, the joint can be connected to one adapter component and the second shaft to the other adapter component. The two adapter components are only connected to each other during the subsequent installation.

In one refinement, the first adapter component is of annular configuration and has a recess with a first inner diameter. The second adapter component is likewise of annular configuration. The second adapter component has a first inner recess with the first inner diameter and a second inner recess with a second inner diameter. The first inner diameter here is larger than the second inner diameter, and the first inner diameter is at least equal to a largest outer diameter of the nut. In one configuration, the joint here has a larger outer diameter than the second shaft.

If, for example, the first adapter component is therefore connected to the joint, in the aforementioned configuration the nut can still be tightened by selection of the first inner diameter and therefore through the recess of the first adapter component. The second inner diameter and the second shaft are preferably coordinated in a matching manner with each other, and therefore, for example, the second shaft can be plugged onto the second adapter component.

In one refinement, the first adapter component and the second adapter component are configured for transmitting a torque.

In one refinement, for the transmission of torque, the first adapter component and the second adapter component each have a serration on an end side. In one refinement, the end sides are furthermore each designed in the manner of a flange, wherein, for example, at least one screw through the flanges can be used for fixing the two components to each other.

In one refinement, the second adapter component is designed for connecting to a second shaft. This takes place, for example, by an outer toothing on the second adapter component or by an inner toothing in a recess of the second adapter component.

In one refinement, the second adapter component has a flange portion protruding radially outward. The second shaft, for example, butts against said flange portion during the installation.

In the refinements below, the second sealing device which closes the cavity in the direction of the adapter unit and in the direction of the second shaft is described.

In one refinement, the second sealing device is formed by a sheet-metal part and a sealing bellows. The sheet-metal part has at least two portions. A first portion of the sheet-metal part is located between the inner hub and the nut. The sheet-metal part is therefore jammed between inner hub and nut. A second portion of the sheet-metal part, which radially surrounds the nut, is located adjacent to the first portion of the sheet-metal part. In one refinement, the surrounding is only partially provided here and is limited, in one refinement, to the fact that the second portion extends radially outward. The sealing bellows is arranged between the second portion of the sheet-metal part and an inner side of the adapter unit and, in one refinement, an inner side of the first adapter component.

In one refinement, a—second—sealing bellows is therefore provided which is guided virtually from the first adapter component to the inner hub or to the nut.

In the further refinements, the second sealing device is formed by a cover. In one refinement, the cover here is of cup-shaped design, with the base of the cup facing the joint.

In one refinement, the lateral wall of the cup is located at least in the first adapter component and, in a further refinement, partially also in the second adapter component.

In one refinement, the cover can be introduced at least into a recess of the adapter unit and, in a further refinement, in particular into a recess of the first adapter component. This recess is then closed by the cover in the introduced state. In one refinement, there is additionally also a sealing element, for example an O ring.

In a further refinement, the cover is likewise of cup-shaped configuration and has a depression or lowered portion in the base. Such a lowered portion makes it possible, for example, to have a targeted influence on joint properties, such as, for example, the maximum angle of deflection of the joint.

In one refinement, the recess of the inner hub has a first nut-receiving portion and a second nut-receiving portion. The nut has a first nut portion and a second nut portion, wherein the first nut portion has a larger outer diameter than the second nut portion. Furthermore, the first nut-receiving portion is configured for receiving the first nut portion and the second nut-receiving portion is configured for receiving the second nut portion. In this refinement, the nut can therefore be introduced into the inner hub. For example, the first shaft is therefore introduced into the inner hub during the installation and the nut is screwed to the first shaft. By adjustment of the radii, the nut can disappear as it were here in the recess of the inner hub.

In the refinement below, the joint arrangement is supplemented by a first shaft. This is therefore the shaft, in the direction of which the cavity is closed by the first sealing device and which is brought into contact with the inner hub via the nut.

The first shaft has a first region with a first outer diameter and an end-side second region with a second outer diameter. The second outer diameter is smaller than the first outer diameter. The first region bears an outer toothing which is configured to match the inner toothing of the recess of the inner hub. The second region has an outer thread matching the inner thread of the nut. The nut has a first nut portion and a second nut portion, wherein the first nut portion has a larger outer diameter than the second nut portion. An axial length of the second region is substantially identical here to an axial length of the second nut portion. In one refinement, nut, inner hub and first shaft are configured here in such a manner that the first nut portion butts against the inner hub. In an alternative refinement, the nut can be introduced into the recess of the inner hub—for example due to the length ratios and radial dimensions—and also together with the first nut portion.

In one refinement, the first adapter component has a stop region. The stop region here has a smaller inner diameter than the recess of the first adapter component with the first inner diameter. There is therefore a region of a constriction in the recess of the first adapter component. In addition, the inner diameter of the stop region is smaller than a largest outer diameter of the cover forming the second sealing device. The cover is therefore held counter to the direction of the joint by the stop region.

In one refinement, the cover has a cup base in which a lowered portion is located. The outer diameter of the lowered portion here is identical to or smaller than the inner diameter of the stop region. In this refinement, the cover therefore sits in the recess of the stop region.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
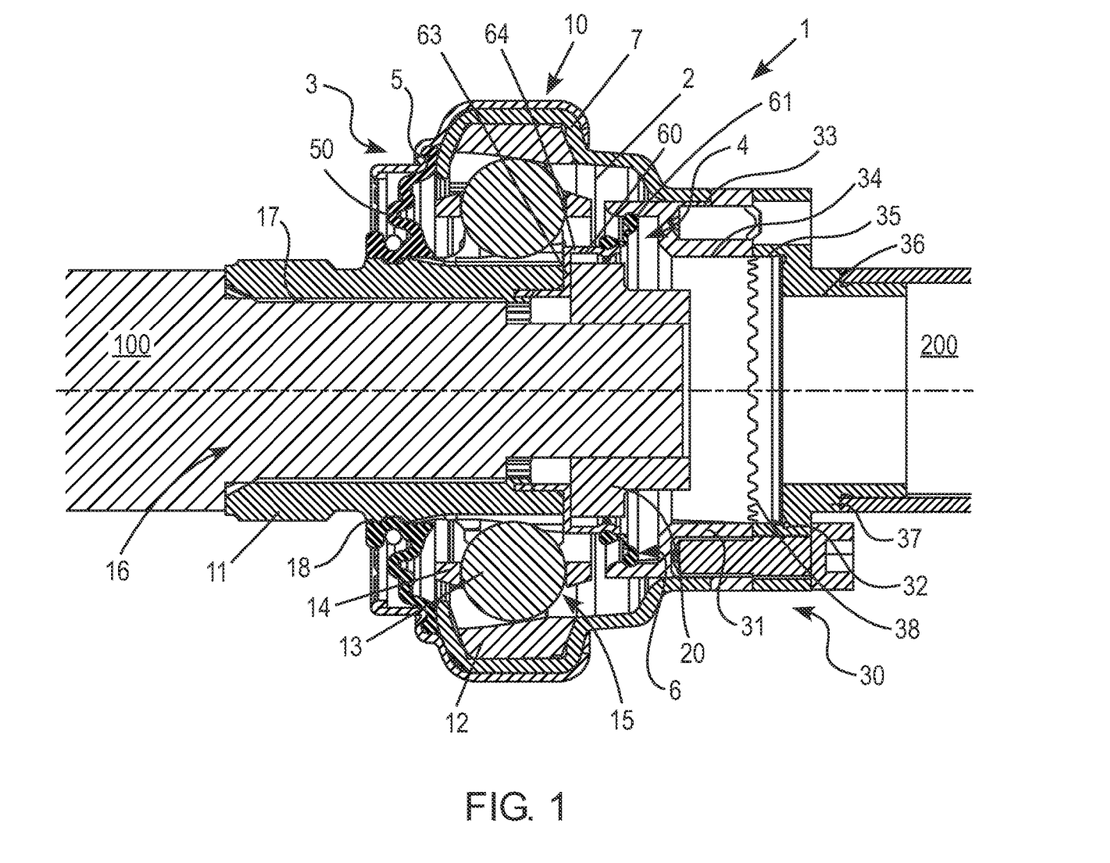
FIG. 1 shows a section through a first refinement in accordance with an embodiment of the joint arrangement of the present invention.

FIG. 1 shows a first refinement of the joint arrangement 1 which permits connection of the joint 10 to a first shaft 100 and a second shaft 200. For this purpose, the joint arrangement 1 has the joint 10, the nut 20 and an adapter unit 30.

The joint 10 consists of an inner hub 11, an outer hub 12 and balls 13 for transmitting torque between the inner hub 11 and the outer hub 12. The balls 13 are arranged in the recesses 15 of a cage 14.

The balls 13 are furthermore located in a cavity 2 of the joint arrangement 1 by joint grease (not illustrated here). The cavity 2 here is closed on the two end sides 3, 4 by a respective sealing device 5, 6.

The inner hub 11 has a recess 16 with an inner toothing 17, into which the first shaft 100 with a corresponding outer toothing is introduced. The inner hub 11 is pressed via the nut 20 in the direction of a region of the first shaft 100 having a larger outer diameter than the region with the outer toothing and is therefore fixed axially along the longitudinal axis of the joint arrangement 1.

The sealing device 5 on the end side 3 in the direction of the first shaft 100 is formed here by a sealing bellows 50. The sealing bellows 50 is connected here on one side to an outer side 18 of the inner hub 11 and on another side to a housing 7.

The housing 7 surrounds the outer hub 12 of the joint 10 and is furthermore connected to the adapter unit 30—in particular to the outer side 33 of a first adapter component 31. The housing 7 therefore also serves for transmitting torque. The housing 7 is additionally also surrounded in the region of the outer hub 12 by a surrounding unit extending in the direction of the first shaft 100, wherein the one end region of the sealing bellows 50 is fixed in particular between the surrounding unit and the outer side of the housing 7.

The second sealing device 6 on the second end side 4 of the cavity 2 is formed by a sheet-metal part 60 and a further sealing bellows 61. The sheet-metal part 60 has a portion 63 which is fixed between the inner hub 11 and the nut 20. A further portion 64 of the sheet-metal part 60 protrudes radially outward and surrounds the nut 20. The further sealing bellows 61 is connected to that portion of the sheet-metal part 60 which surrounds the nut 20 and to an inner side of the adapter unit 30. An end of the cavity 2 is therefore provided by the sheet-metal part 60 and the further sealing bellows 61.

The adapter unit 30 consists of a first adapter component 31 and a second adapter component 32. This division of the adapter unit 30 into two components 31, 32 with different outer diameters firstly permits the transition to a smaller outer diameter of the second shaft 200 and secondly access to the nut 20 during the installation such that the nut 20 can be tightened.

The first adapter component 31 and the second adapter component 32 each have an end-side serration 38 for transmitting the torque.

The first adapter component 31 is annular and has an inner recess 34 with a first inner diameter. The first inner diameter here is at least identical to a largest outer diameter of the nut 20.

The second adapter component 32 has a first inner recess 35 with the first inner diameter, which therefore seamlessly adjoins the recess 34 of the first adapter component 31. Furthermore, the second adapter component 32 has a second inner recess 36 with the second smaller inner diameter.

The second adapter component 32 has a flange portion 37 which protrudes radially outward and up to which the second shaft 200 is guided.

The second shaft 200 here has an inner toothing which is configured to match the outer toothing of the second adapter component 32. It can furthermore be seen that the flange-like end sides of the two adapter components 31, 32 are fixed to each other by screws.

Overall, the torque flows via the first shaft 100, through the joint 10 (i.e. from the inner hub 11 via the balls 13 to the outer hub 12), into the housing 7, into the first adapter component 31, into the second adapter component 32 and finally into the second shaft 200. The same applies to the reverse travel of a torque.

Figure 2:
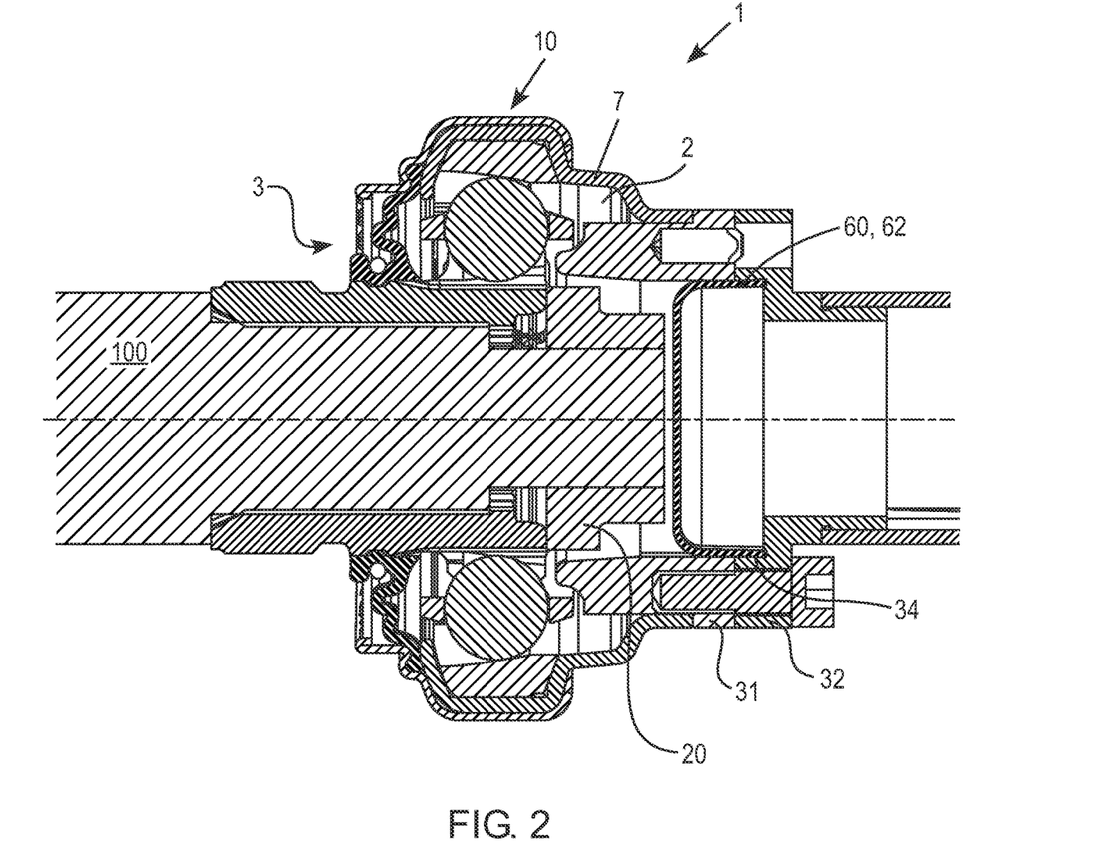
FIG. 2 shows a section through a second refinement in accordance with an embodiment of the joint arrangement of the present invention.

In the refinement of the joint arrangement 1 of FIG. 2, the second sealing device 6 is formed by a cover 62. The first sealing device in the direction of the end side 3 here—in the drawing on the left—furthermore consists of the sealing bellows 50.

The cover 62 is of cup-shaped configuration, and the base of the cup faces the joint 10. The outer diameter of the cover 62 and the inner diameter of the recess 34 are adjusted to each other in such a manner that the cover 62 can be introduced into the first adapter component 31 and closes the latter. The cavity 2 is therefore also closed in this direction. The joint 10 and the first adapter component 31 therefore form a type of unit into which, for example, the joint grease can be introduced. The connection to the second shaft 200 subsequently takes place separately via the second adapter component 32 and the fixing thereof to the first adapter component 31.

It can furthermore be seen that the first shaft 100 protrudes axially along the longitudinal axis over the inner hub 11, and that the nut 20 strikes axially against the inner hub 11. The housing 7 surrounds the outer hub of the joint 10 and is connected to the first adapter component 31.

Figure 3:
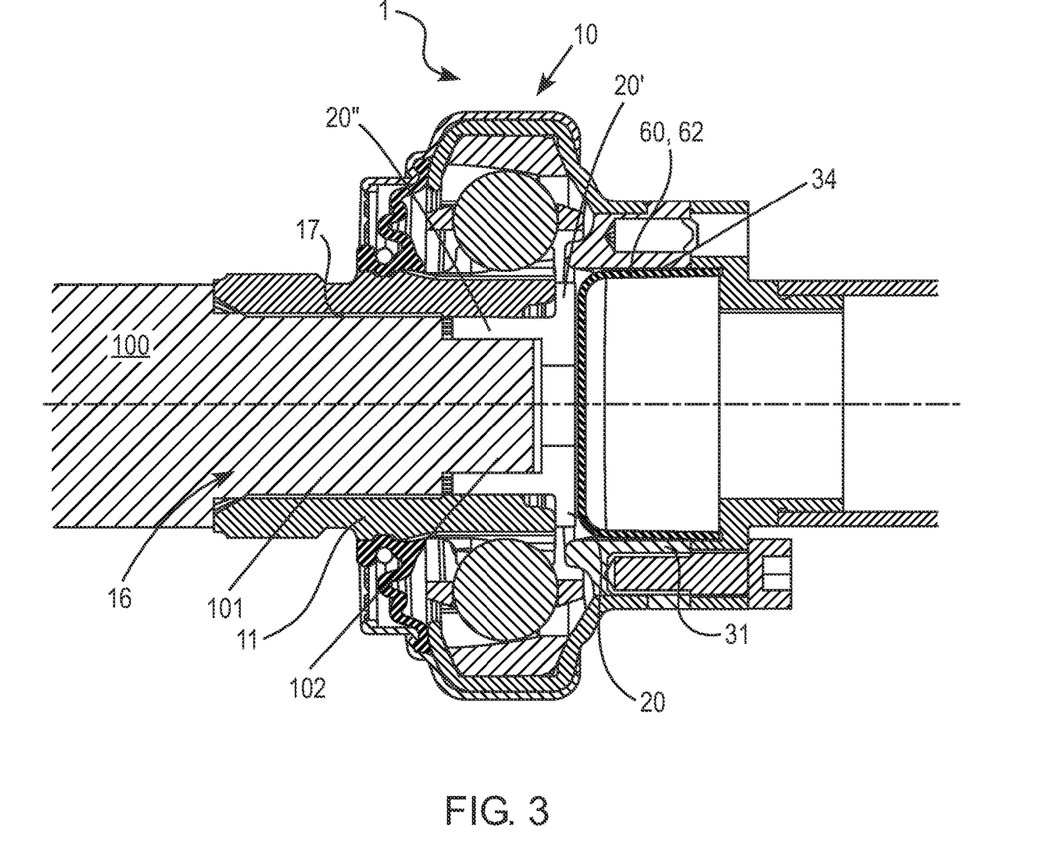
FIG. 3 shows a section through a third refinement in accordance with an embodiment of the joint arrangement of the present invention.

In the joint arrangement 1 of FIG. 3, the second sealing device 6 is likewise formed by a cover 62 which here—as in the refinement of FIG. 2—is at least located in the first adapter component 31.

The refinement of FIG. 3 has a shorter axial overall length for the same joint 10 since the nut 20 partially disappears in the recess 16 of the inner hub 11.

The first shaft 100 has a first region 101 with a first outer diameter and an end-side second region 102 with a second smaller outer diameter. An outer toothing 17 sits on the first region 101 and an outer thread on the second region 102. The first shaft 100 and the inner hub 11 for transmitting torque can therefore be connected to each other and can be braced axially against each other via the nut 20.

The nut 20 has a first nut portion 20' and a second nut portion 20", wherein the first nut portion 20' has a larger outer diameter than the second nut portion 20" and, for example, a polygonal border for the rotation. Furthermore, the axial length of the second region 102 of the first shaft 100 is substantially identical to an axial length of the second nut portion 20". The nut 20 is therefore rotated toward the first shaft 100 and the first nut portion 20' butts here against the end side of the inner hub 11.

Figure 4:
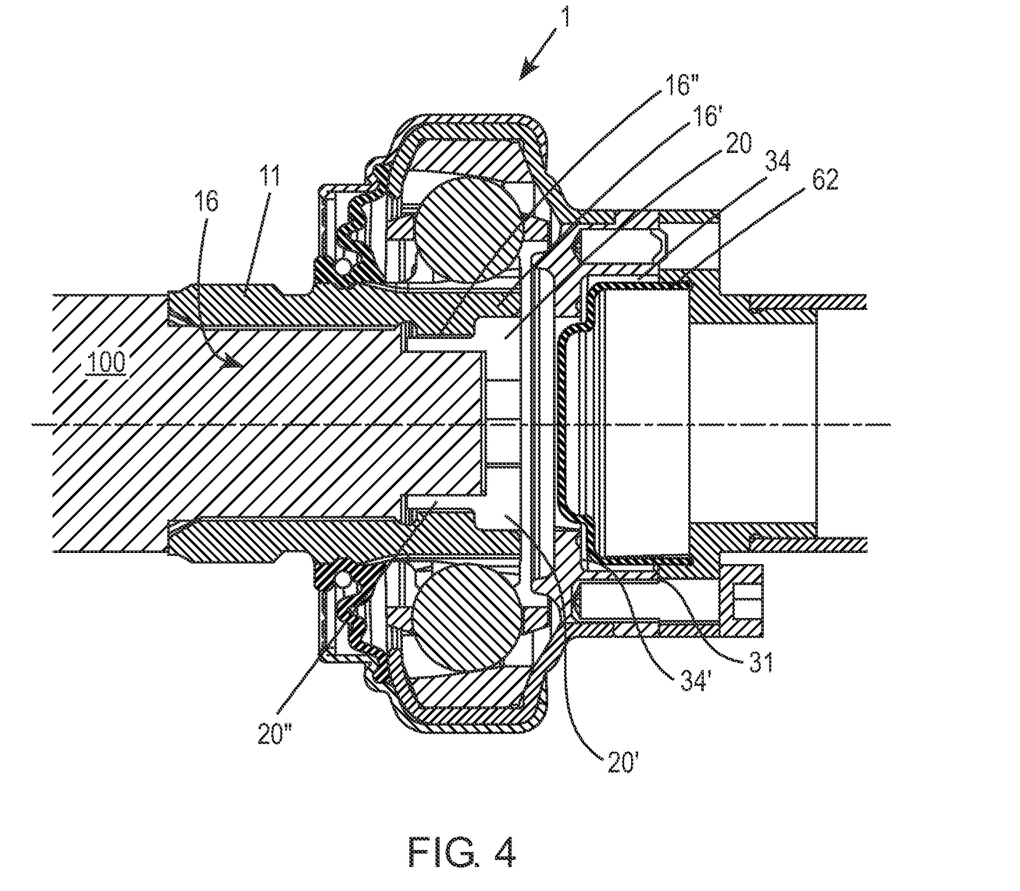
FIG. 4 shows a section through a fourth refinement in accordance with an embodiment of the joint arrangement of the present invention.

In the configuration of FIG. 4, the nut 20 is introduced more deeply into the inner hub 11 and therefore disappears therein.

For this purpose, the recess 16 of the inner hub 11 has, in the direction of its end side, a first nut-receiving portion 16' and a second nut-receiving portion 16". The second nut-receiving portion 16" then lies behind the first nut-receiving portion 16' starting from the end side and has a smaller inner diameter.

The dimensions of the first nut-receiving portion 16' and of the second nut-receiving portion 16" are adjusted here to the dimensions of the two nut portions 20', 20" such that the nut 20 can be introduced with the portion having the smaller outer diameter in front into the recess 16 of the inner hub 11. The axial overall length of the arrangement is therefore shortened.

Furthermore, the cover 62 is likewise of cup-like configuration here and, in its base—preferably centrally—has a lowered portion. The lowered portion resides here in the inner recess of a stop region 34' of the first adapter component 31. The stop region 34' here is a type of constriction of the inner region 34 of the annular first adapter component 31. If the cover 62 is therefore inserted into the first adapter component 31 in the direction of the joint 10, the cover butts against the stop region 34' and the lowered portion closes the interior of the stop region 34'.

Figure 5:
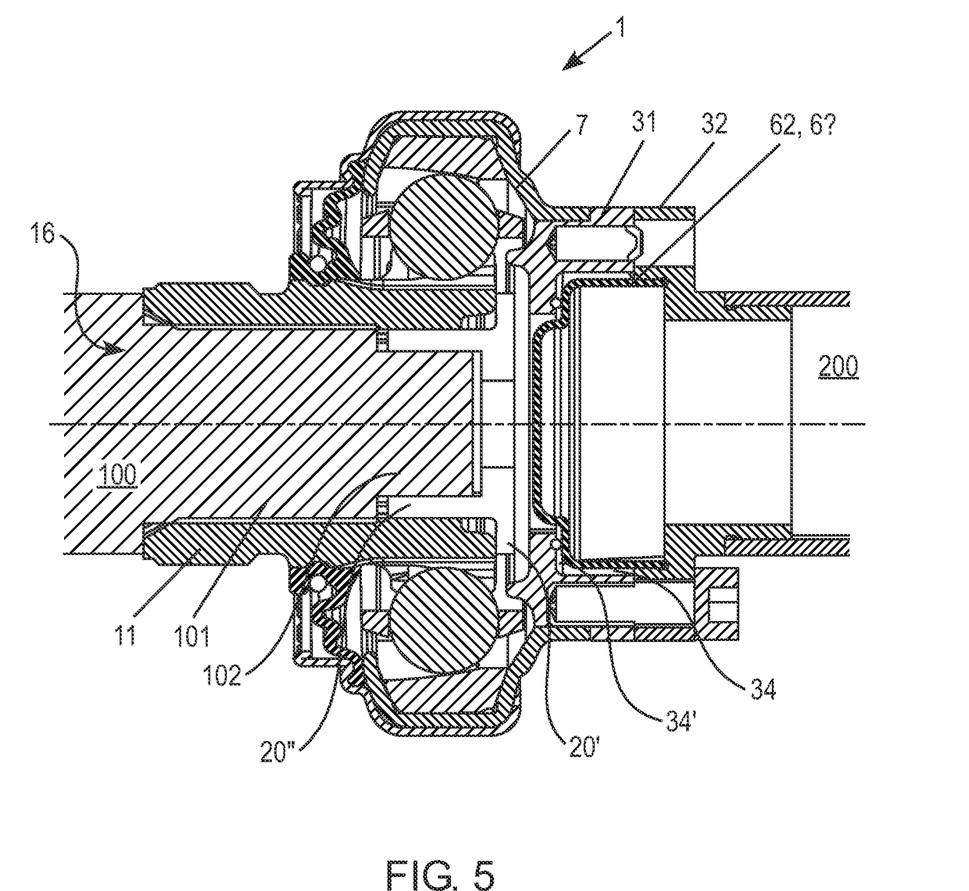
FIG. 5 shows a section through a fifth refinement in accordance with an embodiment of the joint arrangement of the present invention.

In the refinement of the joint arrangement 1 of FIG. 5, the nut 20 with the first nut portion 20' butts against the end side of the inner hub 11. In the region of the second sealing device 6, an O ring can also be seen between the cover 62 and the stop region 34'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A joint arrangement, comprising:
    a joint having an inner hub, an outer hub, balls, a cage with recesses for the balls and a housing which surrounds the outer hub;
    a nut, and
    an adapter unit,
    wherein
        the inner hub includes a recess with an inner toothing for receiving a first shaft,
        the balls and cage are located in a cavity within the housing,
        the cavity is closed at each of two end sides by a respective sealing device,
        the adapter unit has a first adapter component and a second adapter component,
        the first adapter component is of annular configuration and has a recess with a first inner diameter,
        the second adapter component is of annular configuration and has a first inner recess with the first inner diameter and a second inner recess with a second inner diameter smaller than the first inner diameter,
        the first inner diameter is at least as large as a largest outer diameter of the nut,
        the first adapter component and the second adapter component are configured to cooperate to transmit a torque,
        the first adapter component and the second adapter component each have corresponding serrations on respective end sides facing one another,
        the nut is configured to fix the inner hub to the first shaft,
        the inner hub is configured to transfer torque to across the balls to the outer hub,
        the first adapter component is rotationally fixed to rotate with the outer hub, and
        the second adapter component is rotationally fixed to rotated with the first adapter component and to receive a second shaft such that torque is transferable across the joint arrangement between the first shaft and the second shaft.

2. The joint arrangement as claimed in claim 1, wherein the second adapter component has a flange portion protruding radially outwards.

3. The joint arrangement as claimed in claim 1, comprising:
    a first sealing device is formed by a first sealing bellows between to an outer side of the inner hub and the housing,
    a second sealing device is formed by a sheet-metal part and a second sealing bellows,
    a first portion of the sheet-metal part is located between the inner hub and the nut,
    a second portion of the sheet-metal part adjacent to the first portion of the sheet-metal part is configured such that the second portion radially surrounds the nut, and
    the second sealing bellows is arranged between the second portion of the sheet-metal part and an inner side of the adapter unit.

* * * * *